United States Patent [19]

Taniguchi

[11] Patent Number: 4,615,262

[45] Date of Patent: Oct. 7, 1986

[54] HEATER UNIT OF AUTOMOTIVE AIR CONDITIONING SYSTEM

[75] Inventor: Fumio Taniguchi, Ebina, Japan

[73] Assignee: Nissan Motor Co., Ltd., Japan

[21] Appl. No.: 749,868

[22] Filed: Jun. 28, 1985

[30] Foreign Application Priority Data

Jul. 4, 1984 [JP] Japan .......................... 59-100060[U]

[51] Int. Cl.⁴ .............................................. B60H 1/03
[52] U.S. Cl. ................................ 98/2.08; 237/12.3 A
[58] Field of Search ................... 237/12.3 A, 12.3 B; 236/13; 165/42; 98/2, 2.05, 2.08

[56] References Cited

U.S. PATENT DOCUMENTS 2,036,230  4/1936  Mulneaux ..................... 98/2.08 X
4,227,569  10/1980  Wattin ...................... 237/12.3 A X Primary Examiner—Henry Bennett
Attorney, Agent, or Firm—Lowe, Price, LeBlanc, Becker & Shur

[57] ABSTRACT

A heater unit of an automotive air conditioning system has two demisting or defrosting ducts, which extend toward the front windows and the side window respectively. A flap valve is associated with each of the ducts in order to control air flow directed to the front and side windows independently.

3 Claims, 12 Drawing Figures

HEATER UNIT OF AUTOMOTIVE AIR CONDITIONING SYSTEM

BACKGROUND OF THE INVENTION (1) Field of the Invention

The present invention relates in general to an automotive air conditioning system and, more particularly, to a heater unit of the system which has a demisting or defrosting duct from which warm air is discharged toward front and side windows of the vehicle to demist or defrost the same.

(2) Description of the Prior Art

In order to demist or defrost the front and side windows of a vehicle, a heater unit of an automotive air conditioning system is provided with a demisting or defrosting duct mounted near the windows. Upon the requirement for demisting, for example, a valve means associated with the duct is manipulated to open, thereby discharging warm air therefrom toward the windows to demist the same. Usually, the air flow toward both the front and side windows is controlled by a common flap valve. However, in this case, it is impossible to control air flows directed toward the front window and side windows independently. Thus, precise demisting or defrosting operation to each window is not expected from such arrangement. Two conventional heater units are described hereinafter, to clarify the task of the present invention.

SUMMARY OF THE IVNENTION

It is an object of this invention to provide an improved heater unit of an automotive air conditioning system, which is constructed to control the air flow for the front and side windows independently by using respective flap valves.

According to the present invention, there is provided a heater unit of an automotive air conditioning system, which comprises a casing having first and second openings, a first flap valve associated with the first opening to control air flow directed toward a first duct, second and third ducts which are independently connected to the second opening and extend to different portions of the, and second and third flap valves which are associated with the second opening to respectively control air flows directed to the second and third ducts independently.

BRIEF DESCRIPTION OF THE DRAWINGS

Other objects and advantages of the present invention will become apparent from the following description when taken in conjunction with the accompanying drawings, in which.

DESCRIPTION OF CONVENTIONAL HEATER UNITS

Prior to describing in detail the heater unit of the present invention, two conventional heater units will be outlined with reference to FIG. 9 and FIGS. 10 to 12 in order to clarify the task of the present invention.

Figure 9:
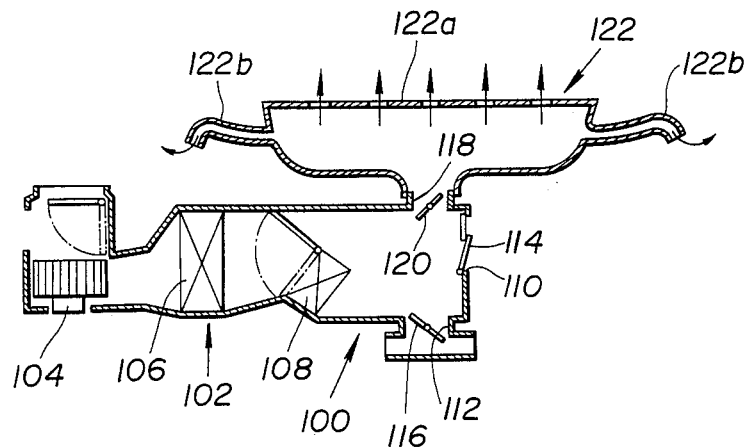
FIG. 9 is a sectional view of a conventional heater unit.

Referring to FIG. 9, there is shown a conventional heater unit 100 combined with a cooler unit 102 to constitute an automotive air conditioning system. This system is clearly disclosed in NISSAN SERVICE WEEKLY issued from NISSAN MOTOR CO., LTD. As shown in the drawing, the system comprises, generally, a blower 104 arranged upstream of the cooler and heater units 102 and 100 respectively, an evaporator 106 of the cooler unit 102 and a heater core 108 of the heater unit 100. The heater unit 100 is provided at its downstream portion with a ventilation opening 110 and a floor side opening 112 which are respectively provided with flap valves 114 and 116. Although not shown in the drawing, the ventilation opening 110 is connected to an air distributor (or ventilation grill) mounted in an instrument panel. The floor side opening 112 is arranged to discharge air therefrom toward the floor portion of the passenger compartment.

Although, in the following description, the terms "demisting" and "demistor" are frequently used, they may be replaced with "defrosting" and "defroster" respectively.

The heater unit 100 is further provided with a demisting opening 118 which is equipped with a flap valve 120. The demisting opening 118 is connected to a demisting duct 122 which comprises generally a front demistor portion 122a from which air is discharged toward the front window of the vehicle to demist the same, and side demistor portions 122b from which air is discharged toward the side windows to demist the same.

As shown, the side demistor portions 122b are integrally connected to the laterally opposed ends of the front demistor portion 122a at positions distant from the opening 118. Thus, in this conventional unit, the air flow toward the front window and the side windows are both controlled by the common flap valve 120. Therefore, in this unit it is impossible to control the air flows toward the front window and the side windows independently hence, precise demisting or defrosting operation to each window cannot be expected from such an arrangement.

Figure 10:
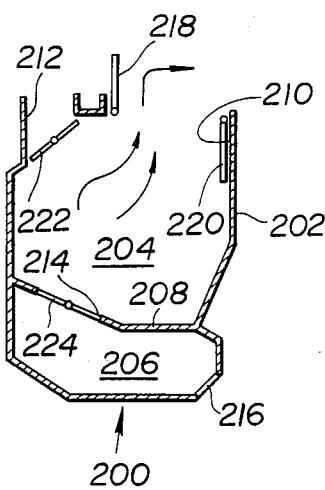
FIGS. 10 to 12 are sectional views of another conventional heater unit, showing various conditions of the same.
Figure 11:
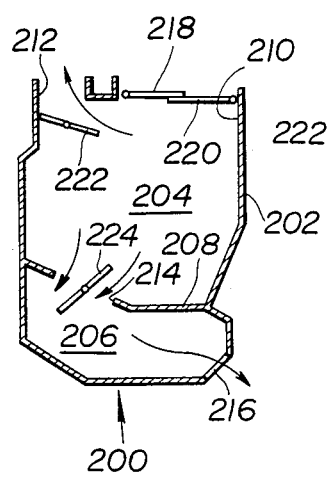
Figure 12:
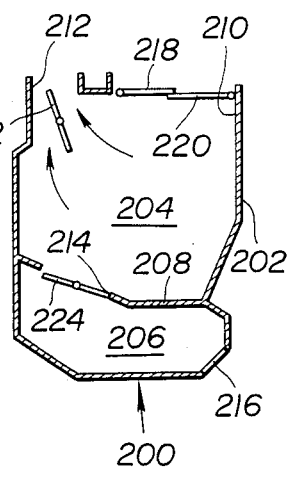

Referring to FIGS. 10 to 12, another conventional heater unit 200 is shown, showing it in different operating conditions. The heater unit 200 comprises a casing 202 the interior of which is divided into two chambers 204 and 206 by a partition wall 208. The chamber 204 is provided at its upper portion with two parallel air outlet openings 210 and 212 which are connected to ventilation and demisting ducts (not shown), respectively. Although not shown in the drawings, the chamber 204 is connected to an air outlet opening of a cooler unit so that air passing through the cooler unit is introduced into the chamber 204. The partition wall 208 is formed with an opening 214 through which the two chambers 204 and 206 are connected. The other chamber 206 is provided with a floor side opening 216 from which air is discharged toward the floor portion of the passenger compartment.

The air outlet opening 210 is closable by two flap valves 218 and 220, while the other air outlet opening 212 is closable by a flap valve 222. The opening 214 is closable by a flap vlave 224 mounted thereat. A demisting duct (not shown) having substantially the same construction as the demisting duct 122 of FIG. 9 is connected to the air outlet opening 212 of the casing 202, so that the air fed to the front and side demistor portions is controlled by the common flap valve 222. Thus, as in the case of the afore-mentioned conventional heater unit 100 of FIG. 9, precise demisting or defrosting operation is not achieved to each window from such a heater unit 200.

DETAILED DESCRIPTION OF THE INVENTION

Figure 1:
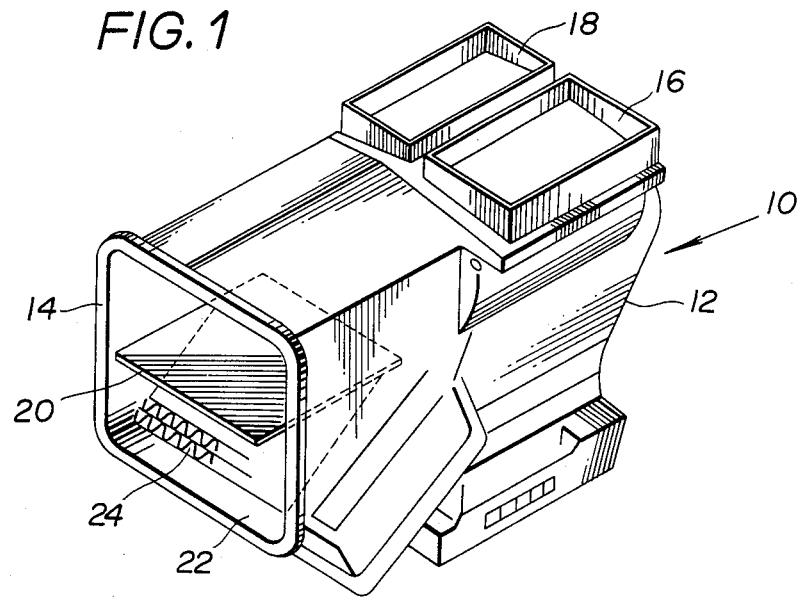
FIG. 1 is a perspective view of a heater unit according to the present invention.

Referring to FIGS. 1 to 8, particularly FIG. 1, there is shown a heater unit 10 of the present invention which can overcome the drawbacks encountered in the conventional units. Although not shown in the drawing, a cooler unit is associated with the heater unit 10 to constitute an air conditioning system of a motor vehicle.

The heater unit 10 comprises a casing 12 adapted for mounting in a suitable position in the motor vehicle. As is seen in FIG. 1, the casing 12 has at its one side an air intake opening 14 and at its upper portion two air outlet openings 16 and 18 arranged in parallel. The air inlet opening 14 is connected to an air outlet opening (not shown) of the cooler unit so that air passing through the cooler unit is introduced into the casing 12 through the air inlet opening 14. In order to produce this air flow, a blower unit (not shown) is arranged upstream of the cooler unit. An air mix door 20 is pivotally arranged in the casing 12 near the air inlet opening 14 so as to adjust the amount of air drawn into a heater core-mounted chamber 22 in the casing 12. The heater core is designated by numeral 24 in the drawing. The air introduced into the casing 12 is then discharged from the outlet openings 16 and 18. These openings 16 and 18 are connected to ventilation and demisting ducts 29, 30, 32 (see FIG. 2) respectively. Thus, hereinafter, these openings 16 and 18 will be referred to as "ventilator opening" and "demisting opening", respectively, for facilitating the description.

Figure 2:
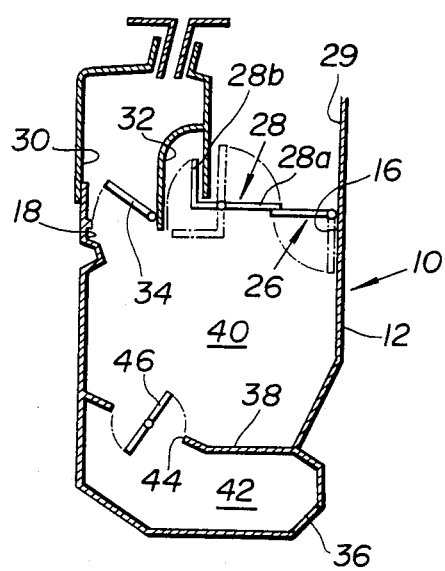
FIG. 2 is a sectional view of the heater unit of the present invention.
Figure 3:
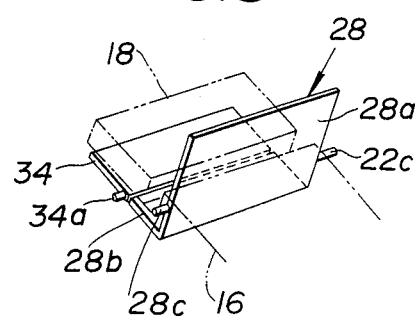
FIGS. 3 and 4 are perspective views of two flap valves used in the heater unit of the invention, showing the valves in different positions.
Figure 4:
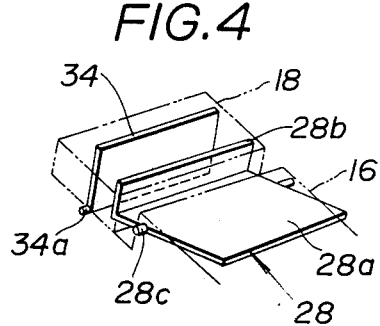
Figure 5:
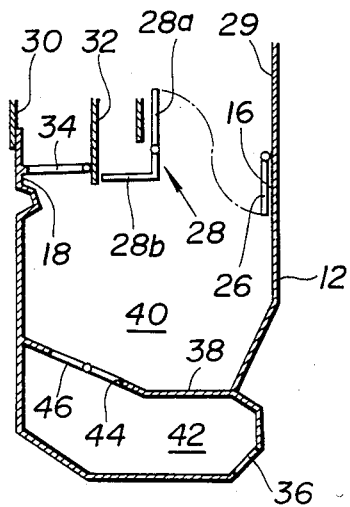
FIGS. 5 to 8 are sectional views similar to FIG. 2, showing various conditions of the heater unit of the present invention.
Figure 6:
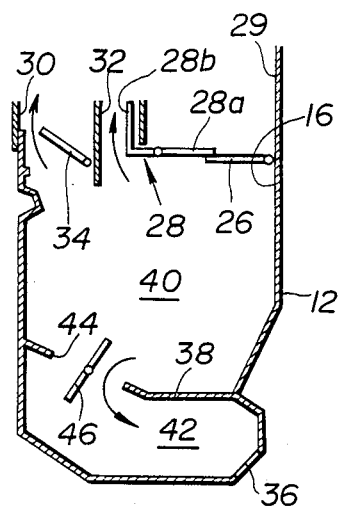
Figure 7:
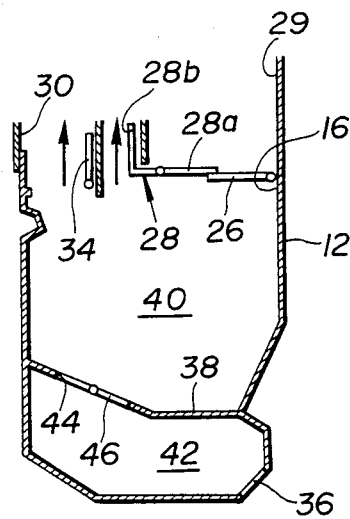
Figure 8:
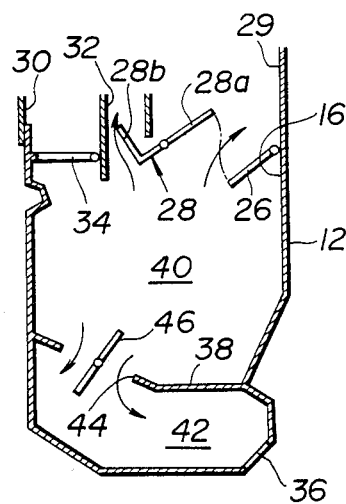

The internal construction of the heater unit 10 is shown in FIG. 2. The ventilator opening 16 is provided with first and second flap valves 26 and 28 (which will be referred to as "first vent flap" and "second vent flap" hereinafter) which cooperate with each other to close and open the ventilator opening 16. The first and second vent flaps 26 and 28 pivot in the opposite directions, that is, these flaps 26 and 28 are pivoted inward and outward respectively when the ventilator opening 16 is required to fully open. Flap 28 is constructed to have a substantially L-shaped cross section which comprises a major flat part 28a and a minor flat part 28b, substantially at right angles to each other.

The demisting opening 18 is connected directly or independently to both a front demisting duct 30 and a side demisting duct 32 which extend respectively toward front and side windows of the vehicle. The demisting opening 18 is provided with a third flap valve 34 (which will be referred to as "front demisting flap" hereinafter) which is arranged to close and open the passage of the front demisting duct 30. The passage of the side demisting duct 32 is closable by the minor flat part 28b of the second vent flap 28. That is, the second vent flap 28 is so arranged that when the major flat part 28a thereof opens the ventilator opening 16, the minor flat part 28b closes the side demisting duct 32 and vice versa, as will be seen from FIG. 2. For achieving this arrangement, a pivot shaft 28c is fixed to the major flat part 28a and positioned above a pivot shaft 34a of the front demisting flap 34 when assembled in the casing 12. This will be understood from FIGS. 3 and 4 which show different positional relationships of the two flaps 28 and 24 with respect to their associated openings 16 and 18 of the casing 12.

The casing 12 further has at its lower portion another air outlet opening 36 through which air is discharged to the floor portion of the passenger compartment. Thus, hereinafter, the opening 36 will be referred to as "floor side opening".

A partition wall 38 is arranged in the casing 12 to define in the same two chambers 40 and 42. The chamber 40 has the ventilator and demisting openings 16 and 18 merged therewith, while the chamber 42 has the floor side opening 36 merged therewith. Although not shown in the drawings, the chamber 40 is directly connected to the air inlet opening 14 (see FIG. 1) so that air from the cooler unit comes to the chamber 40 first. The partition wall 38 is formed with an opening 44 which is provided with a flap valve 46 (which will be referred to as "floor side flap", hereinafter).

In the following, operation of the heater unit 10 will be described. For easy understanding, the description will be made with respect to a condition wherein both the cooler unit (not shown) and the heater core 24 of the heater unit 10 are in their operative conditions. Thus, in this condition, the cooled air from the cooler unit flows into the main chamber 40 of the casing 12 through the air inlet opening 14 of the same. During this flow, a part of the cooled air is warmed by the heater core 24 so that the air in the chamber 40 has somewhat higher temperature as compared with the air just discharged from the cooler unit.

(I) VENTILATION MODE (FIG. 5)

In this mode, air distribution to only the ventilation duct 29 takes place. Thus, the ventilator opening 16 is fully opened by the first and second vent flaps 26 and 28, while the demisting opening 18 is closed by both the front demisting flap 34 and the minor flat part 28b of the second vent flap 28 and the passage for the floor side opening 36 is blocked by the floor side flap 46. Thus, thermally controlled air is fed into the passenger compartment through the ventilation duct 29. Usually, in this mode, outdoor air is introduced into the cooler unit to feed the passenger compartment with the fresh air.

(II) HEATER MODE (FIG. 6)

In this mode, air distribution takes place mainly to the floor side opening 36. Thus, the passage for the floor side opening 36 is fully opened by the floor side flap 46, the front demisting duct 30 is half opened by the front demisting flap 34 and the passage for the side demisting duct 32 is opened by the minor flat part 28b of the second vent flap 28. At the same time, the ventilation opening 16 is closed by the first vent flap 26 and the major flat part 28a of the second vent flap 28.

(III) DEMISTOR MODE (FIG. 7)

In this mode, air distribution to only the front and side demisting ducts 30 and 32 is necessary. Thus, the passages for the front and side demisting ducts 30 and 32 are fully opened by the front demisting flap 34 and the minor flat part 28b of the second vent flap 28, and at the same time, the ventilation opening 16 and the passage for the floor side opening 36 are closed by the associated flaps 26, 28 and 46.

(IV) BI-LEVEL MODE (FIG. 8)

In this mode, air distribution to both the ventilation duct 29 and the floor side opening 36 is mainly necessitated. Thus, the passage for the floor side opening 36 is fully opened by the floor side flap 46, and the ventilation opening 16 is half opened by the second vent flap 28. At the same time, the front demisting duct 30 is fully closed by the front demisting flap 34 and the side demisting duct 32 is half opened by the minor flat part 28b of the second vent flap 28. It is to be noted that due to its construction, the half-closing of the major flat part 28a of the second vent flap 28 to the ventilation opening 16 induces a half-closing of the minor flat part 28b to the side demisting duct 32. Thus, if air distribution to the side demisting duct 32 is not required in this mode, the second vent flap 28 is turned to close the side demisting duct 32 while fully opening the ventilation opening 16.

As will be understood from the foregoing description, in the heater unit 10 according to the present invention, the demisting opening 18 is directly connected to the front and side demisting ducts 30 and 32 in parallel fashion and the passages of these ducts 30 and 32 are respectively provided with flap valves 34 and 28b. Thus, air distribution to each of the front and side windows of the passenger compartment is independently achieved by manipulating the flap valves 34 and 28b, unlike in the case of the afore-mentioned conventional heater units. Furthermore, in the present invention, the flap valve 28b is a part (viz., the minor flat part) of a monolithically constructed flap valve 28 for the ventilation opening 16. Thus, reduction in parts and simple construction are achieved in the present invention.

What is claimed is:

1. A heater unit of an automotive air conditioning system, comprising:
   a casing (12) having an inlet opening (14) and first, second and third outlet openings (16, 18, 44);
   a first duct (29) extending from said first opening (16);
   second and third ducts (32, 30) extending independently from said opening (18) to different portions of said system;
   a first flap valve (26) associated with said first duct (29) to control air flow directed toward first duct (16);
   a second flat valve (28) including first and second flp portions (28a, 28b) which are respectively associated With said first and second ducts (29, 32) to control air flows directed toward said first and second ducts (29, 32), said first and second flap portions (28a, 28b) being arranged and constructed so that when said first flap portion (28a) assumes its open position, said second flap portion (28b) assumes its closed position and vice versa;
   third flap valve (34) associated with said third duct (30) to control air flow directed toward said third duct (30); and
   a fourth flap valve (46) associated with said third opening (44) to control air flow passing therethrough.

2. A heater unit as claimed in claim 1, in which said first and second flap portions (28a, 28b) of said second flap valve (28) are substantially at right angles to each other.

3. A heater unit of an automotive air conditioning system, comprising:
   a casing (12) having an inlet opening (14) and first, second and third outlet openings (16, 18, 44);
   a first duct (29) extending from said first opening (14);
   second and third ducts (32, 30) extending independently from said second opening (18) to different portions of said system;
   a first flap valve (26) associated with said first duct (29) to control air flow directed toward said first duct (29);
   a second flap valve (28) including first and second flap portions (28a, 28b) which are respectively associated with said first and second ducts (29, 32), said first and second flap portions (28a, 28b) being substantially at right angles to each other and arranged and constructed so that when said first flap portion (28a) assumes its fully open position, said second flap portion (28b) assumes its fully closed position and vice versa;
   a third flap valve (34) associated with said third duct (30) to control air flow directed toward said third duct (30);
   a fourth flap valve (46) associated with said third opening (44) to control air flow passing therethrough; and
   a partition wall (38) formed to surround said third opening (44) and disposed in said casing (12) to divide the interior of said casing (12) into a first chamber (40) merged with said first and second openings (16, 18) and a second chamber (42) being merged with said third opening (44).

\* \* \* \* \*